(12) United States Patent
Sotzing et al.

(10) Patent No.: US 8,107,153 B2
(45) Date of Patent: Jan. 31, 2012

(54) FLEXIBLE ELECTROCHROMIC DEVICES, ELECTRODES THEREFOR, AND METHODS OF MANUFACTURE

(75) Inventors: Gregory A. Sotzing, Storrs, CT (US); Michael A. Invernale, West Haven, CT (US)

(73) Assignee: The University of Connecticut, Farmington, CT (US)

( * ) Notice: Subject to any disclaimer, the term of this patent is extended or adjusted under 35 U.S.C. 154(b) by 0 days.

(21) Appl. No.: 12/727,927

(22) Filed: Mar. 19, 2010

(65) Prior Publication Data

US 2010/0245971 A1 Sep. 30, 2010

Related U.S. Application Data

(60) Provisional application No. 61/165,190, filed on Mar. 31, 2009.

(51) Int. Cl.
*G02F 1/15* (2006.01)
(52) U.S. Cl. ........................................................ 359/265
(58) Field of Classification Search .......... 359/265–275; 313/313, 582, 584, 586
See application file for complete search history.

(56) References Cited

U.S. PATENT DOCUMENTS

| | | | | |
|---|---|---|---|---|
| 4,983,814 A | * | 1/1991 | Ohgushi et al. | 219/545 |
| 6,072,619 A | * | 6/2000 | Kiryuschev et al. | 359/245 |
| 6,103,640 A | * | 8/2000 | Yoshikawa et al. | 442/16 |
| 6,919,105 B2 | * | 7/2005 | Xue et al. | 427/482 |
| 7,740,656 B2 | * | 6/2010 | Mensah et al. | 623/2.36 |

FOREIGN PATENT DOCUMENTS

| WO | WO 2007/099889 | * | 7/2007 |
|---|---|---|---|
| WO | WO2008/066458 A1 | | 6/2008 |

OTHER PUBLICATIONS

"Conductivity trends of PRDOT-PSS impregnated fabric and the effect of conductivity on electrochromic textile", University of Connecticut, Department of Chemistry and the Polymer Program, Storrs, Connecticut, USA; pp. 1-20; ACS Applied Materials and Interfaces, 2010, in submission).

"All Organic Electrochromic Spandex", Department of Chemistry and the Polymer Program, University of Connecticut, Storrs, Connecticut, USA, pp. 296-300, including supplemental and supporting information; 2010 American Chemical Society; vol. 2, No. 1.

"The Effects of Colored Base Fabric on Electrochromic Textile", University of Connecticut, Department of Chemistry and the Polymer Program, Storrs, Connecticut, USA, pp. 1-16, Jan. 4, 2010.

(Continued)

*Primary Examiner* — Ricky Mack
*Assistant Examiner* — Tuyen Tra
(74) *Attorney, Agent, or Firm* — Cantor Colburn LLP

(57) ABSTRACT

An electrochromic fiber or fabric is disclosed. The fiber or fabric includes a flexible, electrically conductive fiber, and a layer comprising an electrochromic material disposed on and surrounding the flexible, electrically conductive fiber. In one embodiment, the fiber or fabric is both flexible and elastic. The fibers and fabrics are of particular utility in electrochromic devices, particularly those which form or are a part of garments.

17 Claims, 5 Drawing Sheets

OTHER PUBLICATIONS

"High Contrast Solid-State Electrochromic Devices from Substituted 3, 4-Propylenedioxythiophenes Using the Dual Conjugated Polymer Approach", Synthetic Metals (2007), 157(6-7), 261-268.

"Electrochemical Study of Dual Conjugated Polymer Electrochromic Devices", Journal of Electroanalytical Chemistry (2007), 609(2), 75-84.

"Maximum Contrast from an Electrochromic Material", Electrochemistry Communications (2007), 9(8), 1931-1935.

"Unique Variable-Gap Polyheterocycles for High-Contrast Dual Polymer Electrochromic Devices", Synthetic Metals (1997), 85(1-3), 1295-1298.

"Rapid Switching Solid State Electrochromic Devices Based on Complementary Conducting Polymer Films", Polymer Films (Weinheim, Germany) (1996), 8(10), 808-811.

"Optimization, Preparation, and Electrical Short Evaluation for 30 cm2 Active Area Dual Conjugated Polymer Electrochromic Windows", Organic Electronics (2007), 8(4), 367-381.

International Search Report PCT/US2010/027956 (UCT0156PCT), mailed Jun. 7, 2010, 7 pages.

Written Opinion of International Search Report for PCT/US2010/027956 (UCT0156PCT), mailed Jun. 7, 2010, 7 pages.

* cited by examiner

US 8,107,153 B2

FLEXIBLE ELECTROCHROMIC DEVICES, ELECTRODES THEREFOR, AND METHODS OF MANUFACTURE

CROSS REFERENCE TO RELATED APPLICATION

This application claims the benefit of U.S. Provisional Application Ser. No. 61/165,190 filed Mar. 31, 2009, which is fully incorporated herein by reference in its entirety.

BACKGROUND

This disclosure is generally related to electrochromic devices, electrodes therefor, and methods of forming the electrodes.

An electrochromic device is a self-contained, two-electrode (or more) electrolytic cell that includes an electrolyte and one or more electrochromic materials. Electrochromic materials can be organic or inorganic, and reversibly change visible color when oxidized or reduced in response to an applied electrical potential. Electrochromic devices are therefore constructed so as to modulate incident electromagnetic radiation via transmission, absorption, or reflection of the light upon the application of an electric field across the electrodes. The electrodes and electrochromic materials used in the devices are dependent on the type of device, i.e., absorptive/transmissive or absorptive/reflective.

Absorptive/transmissive electrochromic devices typically operate by reversibly switching the electrochromic materials between colored and bleached (colorless) states. Typical electrochromic materials used in these devices include indium-doped tin oxide (ITO), fluorine-doped tin oxide ($SnO_2$:F), poly(3,4-ethylenedioxythiophene):poly(styrene sulfonate) (PEDOT-PSS), and single-walled carbon nanotubes (SWNT). Flexible electrochromic devices of this type have been constructed using a flexible substrate layer of polyethylene terephthalate (PET), a transparent layer of ITO as the working electrode, and a third layer of PEDOT-PSS as the counter electrode. Drawbacks with ITO include high cost and lower flexibility compared to PEDOT-PSS. PEDOT-PSS, however, suffers from a lower conductivity value compared to ITO. A further drawback of ITO devices for some applications is that in order for light to pass through the device, the electrodes must be transparent.

The absorptive/reflective-type electrochromic devices typically contain a reflective metal as an electrode. The electrochromic polymer is deposited onto this electrode and is faced outward to allow incident light to reflect off the polymer/electrode surface. The counter electrode is behind the active electrode. Similar electrode and electrochromic materials can be used in these reflective devices, in particular ITO and PEDOT-PSS.

This disclosure addresses the ongoing challenge of making flexible electrochromic devices without ITO that exhibit one or more advantageous properties, such as fast switching, high contrast, flexibility, and in some cases stretchability. It would be a further advantage if such devices did not require a transparent electrode or transparent conductive substrate.

BRIEF SUMMARY

The above-described and other needs are met by an electrochromic fiber or fabric comprising a flexible, electrically conductive fiber, and a layer comprising an electrochromic material disposed on and surrounding the flexible, electrically conductive fiber. In one embodiment, the fiber or fabric is a natural or synthetic polymer that has been rendered electrically conductive, for example by coating with an electrically conductive material, or impregnating a fabric with electrically conductive particles. Electrically conductive polymers can be used as the electrically conductive material, for example PEDOT-PSS. In a particularly advantageous embodiment, the fiber or fabric is both flexible and elastic.

Electrochromic devices comprising the above-described electrochromic fibers and fabrics are also described. In one embodiment, electrochromic devices having individually addressed electrochromic fibers are described. The devices are especially useful in the manufacture of garments or garment components.

Methods for the manufacture of the electrochromic fibers and fabrics are also described. In one embodiment, a method of forming a flexible, electrochromic fiber or fabric, comprises disposing an electrochromic material on a surface of an electrically conductive fiber or fabric to form an electrochromic layer on the surface of the electrically conductive fiber or fabric. Disposing the electrochromic material can comprise disposing a monomeric electrochromic precursor, and polymerizing the electrochromic precursor to form a polymeric electrochromic layer on the surface of the electrically conductive fiber or fabric.

BRIEF DESCRIPTION OF THE DRAWINGS

The components in the drawings are not necessarily to scale, emphasis instead being placed upon clearly illustrating the principles of the embodiments described herein. Moreover, in the drawings, like reference numerals designate corresponding parts throughout the several views.

DETAILED DESCRIPTION

Figure 1:
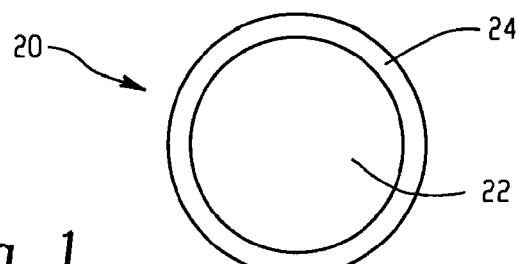
FIG. 1 is a schematic cross-sectional view of an exemplary electrically conductive fiber comprising a non-electrically conductive filament and an outer layer of an electrically conductive material.

This disclosure is directed to flexible electrodes and electrochromic (EC) devices. In one embodiment, a flexible electrode comprises a flexible, electrically conductive fiber coated with an electrochromic polymer. The flexible, electrically conductive fiber can be used as single, independently addressable electrodes in a fabric, or can be used to manufacture a fabric electrode comprising a plurality of the flexible, electrically conductive fibers.

In another embodiment, a flexible, electrochromic electrode comprises a flexible, non-electrically conductive fabric that is rendered electrically conductive and electrochromic. In one embodiment, the fabric is coated or impregnated with an electrically conductive material, then coated with an electrochromic material.

Advantageously, the foregoing devices and the electrodes possess improved flexibility. This disclosure is further directed to electrochromic devices that are both flexible and elastic, that is, reversibly stretchable such that upon removal of a stretching force, the device relaxes to its pre-stretched dimensions. In one embodiment, the device can be repeatedly reversibly stretched in at least one dimension without significant deterioration in electrochromic properties. The flexible, elastic electrochromic devices comprise an electrode that is manufactured from a flexible, elastic fiber or fabric coated with an electrically conductive and electrochromic polymer.

The foregoing electrodes and devices do not require an indium-doped tin oxide (ITO). By replacing the ITO, the cost of the electrode is considerably lowered. The electrochromic devices can be operated in a reflective mode, and therefore do not require a transparent electrode or transparent conductive substrate. The devices also exhibit good switching times, reversibly changing color in response to an applied electrical potential in less than one second. The color change can differ depending on the polarity of the applied field.

The above-described electrochromic devices and electrodes are particularly useful in clothing and other applications requiring flexibility and/or elasticity.

In a first embodiment, the electrochromic devices contain electrodes formed from electrically conductive fibers that are coated with an electrochromic polymer, or non-electrically conductive fibers that are coated with an electrically conductive, electrochromic material. The term "fiber" as used herein includes single filament and multi-filament fibers, i.e., fibers spun, woven, knitted, crocheted, knotted, pressed, plied, or the like from multiple filaments. No particular restriction is placed on the length of the conductive fiber, other than practical considerations based on manufacturing considerations and intended use. Similarly, no particular restriction is placed on the width (cross-sectional diameter) of the conductive fibers, other than those based on manufacturing and use considerations. The width of the fiber can be essentially constant, or vary along its length. For many purposes, the fibers can have a largest cross-sectional diameter of 2 nanometers and larger, for example up to 2 centimeters, specifically from 5 nanometers to 1 centimeter. In an embodiment, the fibers can have a largest cross-sectional diameter of 5 to 500 micrometers, more particularly, 5 to 200 micrometers, 5 to 100 micrometers, 10 to 100 micrometers, 20 to 80 micrometers, or 40 to 50 micrometers. In one embodiment, the conductive fiber has a largest circular diameter of 40 to 45 micrometers. Further, no restriction is placed on the cross-sectional shape of the conductive fiber, providing the desirable properties such as electrochromic behavior, flexibility, and/or stretchability are not adversely affected. For example, the conductive fiber can have a cross-sectional shape of a circle, ellipse, square, rectangle, or irregular shape.

When electrically conductive fibers are used, the fibers comprise an electrically conductive material such as a metal, an electrically conductive organic material, or a combination thereof. Metals typically have a conductivity on the order of $10^4$ Siemens per centimeter (S/cm) or higher, while conductive organic materials typically have a conductivity on the order of $10^{-1}$ to $10^3$ S/cm.

Exemplary electrically conductive metals that can be formed into flexible fibers include silver, copper, gold, iron, aluminum, zinc, nickel, tin, and combinations comprising at least one of the foregoing metals. Iron and iron alloys such as stainless steel (an alloy of carbon, iron, and chromium) can be used. In one embodiment, the fibers consist essentially of a metal or metal alloy such as stainless steel. In another embodiment, the fiber consists of a metal or metal alloy such as stainless steel.

Exemplary electrically conductive organic materials that can be formed into flexible fibers include conjugated polymers such as poly(thiophene), poly(pyrrole), poly(aniline), poly(acetylene), poly(p-phenylenevinylene) (PPV), PEDOT-PSS, and the like.

Electrically conductive fibers formed from non-conductive fibers that have been rendered electrically conductive can also be used. In one embodiment, as shown in FIG. 1, fiber 20 is a nonconductive fiber 22 that has been coated with a layer of a conductive material 24. Exemplary nonconductive fibers include those known for use in the manufacture of fabrics, including natural materials (e.g., cotton, silk, and wool) and synthetic organic polymers (e.g., poly(amide) (nylon), poly (ethylene), poly(ester), poly(acrylic), polyurethane (spandex), poly(lactide), and the like). Specific fibers of this type include a nylon or spandex fiber. The above-described metal and organic polymer conductive materials can be used to coat the nonconductive fibers. In one embodiment the nylon or spandex fiber is coated with a conductive metal such as a stainless steel. The coated fibers can be used as a fiber as described herein, or at least two coated fibers can be woven, knitted, crocheted, knotted, pressed, or plied to form a multi-filament fiber. It is also possible to have multiple nonconductive fibers formed into a yarn, and then coated with a conductive material. This construction can be used as a fiber, or be woven, knitted, crocheted, knotted, pressed, or plied to form a multi-filament fiber.

Figure 2:
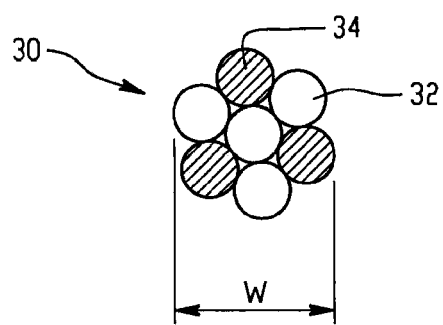
FIG. 2 is a schematic cross-sectional view of an exemplary electrically conductive fiber comprising four nonconductive (e.g., nonconductive organic polymer) filaments combined with three electrically conductive (e.g., electrically conductive metal) filaments.

Alternatively, a combination of electrically nonconductive and conductive fibers can be used to form an electrically conductive fiber. An example is shown in FIG. 2, which is a cross-sectional view of a conductive fiber 30 comprising four natural or synthetic organic polymer fibers 32 spun with three conductive metal fibers 34. FIG. 2 is meant to be illustrative and non-limiting; electrically conductive fiber 30 can comprise one or more organic polymer fibers and one or more metal filaments spun together to form a conductive fiber. Any cross-sectional arrangement of the organic polymer fiber and conductive metal filaments can be used, provided that the conductive metal filaments are arranged so as to provide the requisite conductivity to the fiber. In still another embodiment, one or more non-electrically conductive fibers are wrapped with an electrically conductive fiber, ribbon, or tape.

In still another embodiment, any of the exemplary nonconductive fibers disclosed herein can be coated with an electrically conductive polymer, for example conjugated polymers such as poly(thiophene), poly(pyrrole), poly (aniline), poly(acetylene), poly(p-phenylenevinylene) (PPV), PEDOT-PSS, and the like. In a specific embodiment, a flexible, elastic fiber is coated with an electrically conductive material such as PEDOT-PSS, sulfonated polythieno[3, 4-b]thiophene polystyrenesulfonate, the various poly (aniline)s (e.g., those sold by Enthone under the trade name ORMECON), and the like. In a specific embodiment, a nylon or spandex fiber is coated with PEDOT-PSS.

The electrically conductive fibers (which as used herein include non-electrically conductive fibers rendered electrically conductive) are coated with an electrochromic material as described in further detail below to provide an electrically conductive, electrochromic fiber. The thickness of the electrically conductive and electrochromic layer will depend on factors such as the type of fiber, the type of electrolyte, the type of electrically conductive and electrochromic material, the device configuration, performance requirements, and like considerations, and can be readily determined by one of ordinary skill in the art without undue experimentation using the guidance herein. In one embodiment, the electrically conductive and electrochromic layer has a thickness of 0.1 to 10 micrometers, more specifically 0.1 to 6 micrometers, and even more specifically 3 to 6 micrometers.

The electrically conductive, electrochromic fiber can be used in the form of a single fiber, a yarn, or a fabric. A "yarn" as used herein is a multi-fiber thread formed from two or more of the electrically conductive, electrochromic fibers by a variety of means, including but not limited to spinning, braiding, knitting, crocheting, knotting, pressing, and plying. For convenience in later discussion, the term "electrochromic fiber" is used to refer to the electrically conductive, electrochromic fibers and yarns. It is to be understood that this term encompasses electrically conductive fibers coated with an electrochromic material; non-electrically conductive fibers that have been rendered electrically conductive and coated with an electrochromic material; and yarns comprising one or more of the foregoing types of fibers. Electrically conductive, electrochromic yarns can be used in place of or in addition to the electrically conductive, electrochromic fibers. Further, the electrochromic fibers can be used in the manufacture of a fabric. The fabric can be woven (e.g., a mesh, twill, satin, basket, leno or mock leno weave) or nonwoven (e.g., a felt, wherein the fibers are entangled).

Figure 3:
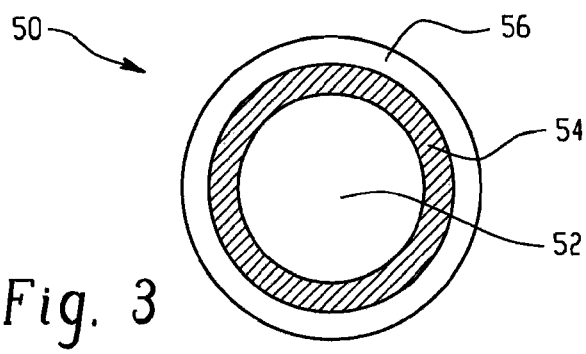
FIG. 3 is a schematic cross-sectional view of an exemplary electrochromic fiber electrode.

In one embodiment, the electrochromic fibers are used as an electrode in an electrochromic device. When used as an electrode, the electrochromic fiber is coated with an electrolyte layer (described in further detail below). FIG. 3 is a schematic cross-sectional view of an electrochromic fiber electrode 50 comprising a conductive fiber 52, e.g., a stainless steel fiber, an electrochromic layer 54 comprising an electrochromic material disposed on the conductive fiber 52, and an electrolyte layer 56 comprising an electrolyte (e.g., a gel electrolyte) disposed on the electrochromic layer 54. While conductive fiber 52 is shown as a unitary core, any configuration of an electrically conductive fiber can be used.

The thickness of the electrochromic layer 54 will depend on factors such as the type of electrically conductive fiber, the type of electrolyte, the type of electrochromic material, the device configuration, performance requirements, and like considerations, and can be readily determined by one of ordinary skill in the art without undue experimentation using the guidance herein. In one embodiment, the electrochromic layer 54 has a thickness of 0.1 to 10 micrometers, more specifically 0.1 to 6 micrometers, and even more specifically 3 to 6 micrometers.

Alternatively, fiber 52 can be non-conductive, e.g., a spandex fiber, and layer 54 can be an electrically conductive and electrochromic layer such as PEDOT-PSS.

In either embodiment, the thickness of the gel electrolyte layer 56 will depend on factors such as the type of electrochromic fiber, the type of electrolyte, the device configuration, performance requirements, and like considerations, and can be readily determined by one of ordinary skill in the art without undue experimentation using the guidance herein. In one embodiment, the gel electrolyte layer has a thickness of 10 to 500 micrometers, more specifically 10 to 200 micrometers, 20 to 150 micrometers, or 50 to 100 micrometers.

Figure 4:
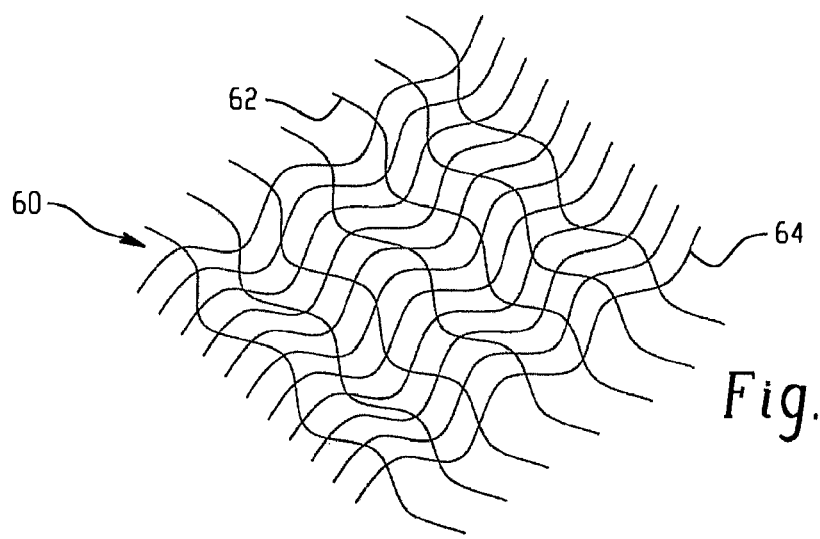
FIG. 4 is a schematic cross-sectional view of an exemplary electrochromic fabric in the form of a woven sheet, and comprising an electrochromic fiber electrode.

Electrochromic devices comprising one or more of the electrochromic fiber electrodes are disclosed herein. FIG. 4 is a schematic perspective view of an exemplary fabric 60 in the form of a woven sheet, comprising a first electrochromic fiber electrode 62 as described above and a second fiber electrode 64. The first electrochromic fiber electrode 62 can be, for example, a flexible, elastic material, such as spandex or nylon, coated with an electrically conductive material such as PEDOT-PSS, and further coated with an electrochromic material.

In one embodiment, second fiber electrode 64 is also an electrochromic fiber electrode as described above. The second electrochromic fiber electrode 64 can be, for example, a flexible, elastic material, such as spandex or nylon, coated with an electrically conductive material such as PEDOT-PSS, and further coated with an electrochromic material. In another embodiment, second fiber electrode 64 is a fiber electrode that is not electrochromic. An exemplary non-electrochromic fiber electrode comprises a conductive fiber, e.g., a stainless steel fiber, and an electrolyte layer comprising an electrolyte disposed on the conductive fiber. Any of the above-described exemplary electrically conductive fibers can be used as the conductive fiber.

The first electrochromic fiber electrode 62 and the second fiber electrode 64 can be independently electronically addressable. When both the first electrochromic fiber electrode 62 and the second fiber electrode 64 are each electrochromic, each can display the same or a different visible color in response to an applied electrical potential.

While the first electrochromic fiber electrode 62 and the second fiber electrode 64 are shown in a perpendicular woven relationship in FIG. 4, it is also possible for each of the fiber electrodes 62 and 64 to be cowoven or entangled in a non-perpendicular relationship, provided that a portion of each of the electrochromic fiber electrodes are in contact. Further, the unlabeled fiber electrodes making up the woven pattern can each independently be electrochromic fiber electrodes or non-electrochromic fiber electrodes. While a woven fabric is illustrated in FIG. 4, nonwoven fabric electrodes comprising one or more electrochromic fiber electrodes are also within the scope of this disclosure. In one embodiment, a plurality of electrochromic, electrically conductive fibers are present in the woven or nonwoven fabric. In another embodiment, the majority (greater than 50%) of the fibers present in the woven or nonwoven fabric are electrochromic, more specifically greater than 75%, and even more specifically greater than 90% of the fibers present in the woven or nonwoven fabric electrode are electrochromic. Alternatively, all of the electrode fibers in the woven or nonwoven fabric can be electrochromic.

Figure 5:
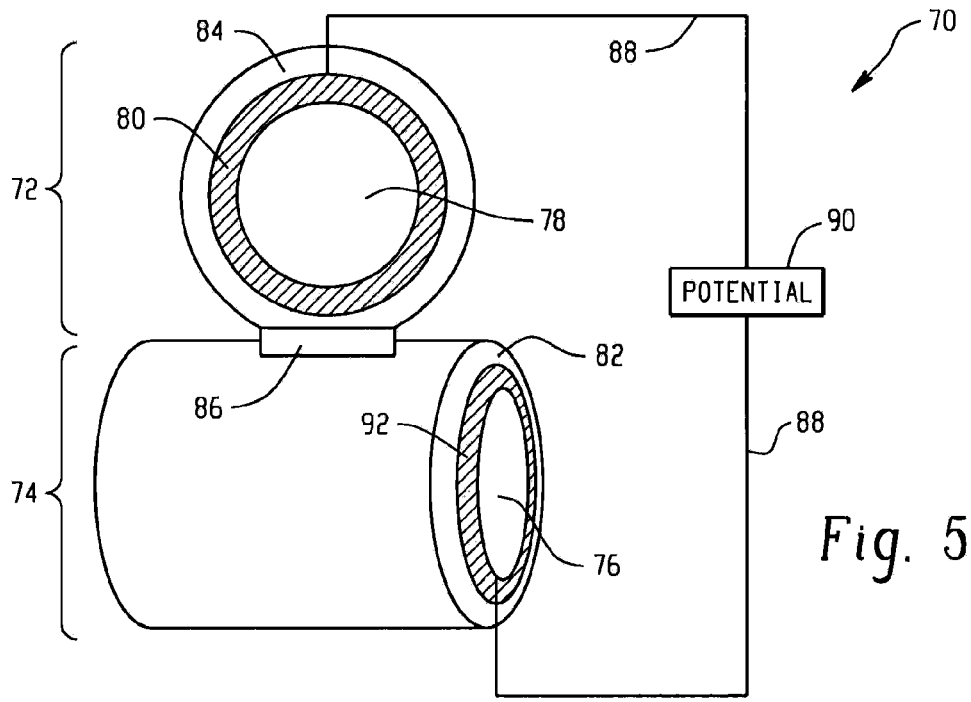
FIG. 5 is a magnified, schematic cross-sectional view of an exemplary electrochromic device comprising the electrochromic fabric of FIG. 4.

FIG. 5 is a magnified schematic cross-sectional view of an exemplary electrochromic device 70 comprising a woven fabric as shown in FIG. 4 wherein the fiber electrodes 72 and 74 are independently addressable. The woven fabric comprises a first electrochromic fiber electrode 72 woven in a first direction, the first fiber electrode comprising a first electrically conductive fiber 78, a first electrochromic layer 80 comprising a first electrochromic polymer disposed on electrically conductive fiber 78, and a first gel electrolyte layer 84 comprising a first gel electrolyte disposed on the first electrochromic layer 80. A second fiber electrode 74 is woven in another direction (i.e., perpendicular as shown in FIG. 4). Second fiber electrode 74 can comprise second electrically conductive fiber 76 (e.g., a stainless steel fiber), a second electrochromic layer 92 comprising a second electrochromic polymer disposed on second electrically conductive fiber 76 (e.g., a stainless steel fiber), and a second gel electrolyte layer 82 comprising a second gel electrolyte disposed on second electrochromic layer 92. While a woven fabric having the fibers in perpendicular relationship is shown, the fibers can be oriented in any direction relative to each other.

Conductive circuit 88 connects first electrochromic fiber electrode 72 and second fiber electrode 74 to electrical potential generator 90. Joint 86 provides a conductive interface between first and second fiber electrodes 72 and 74. Joint 86 can be formed by thermally treating the fabric at a temperature sufficient to fuse the first and second gel electrolyte layers 82 and 84 at an intersection point of the first electrochromic fiber electrode 72 and the second fiber electrode 74, thus forming a continuous conductive path from one fiber electrode to the other.

Figure 6:
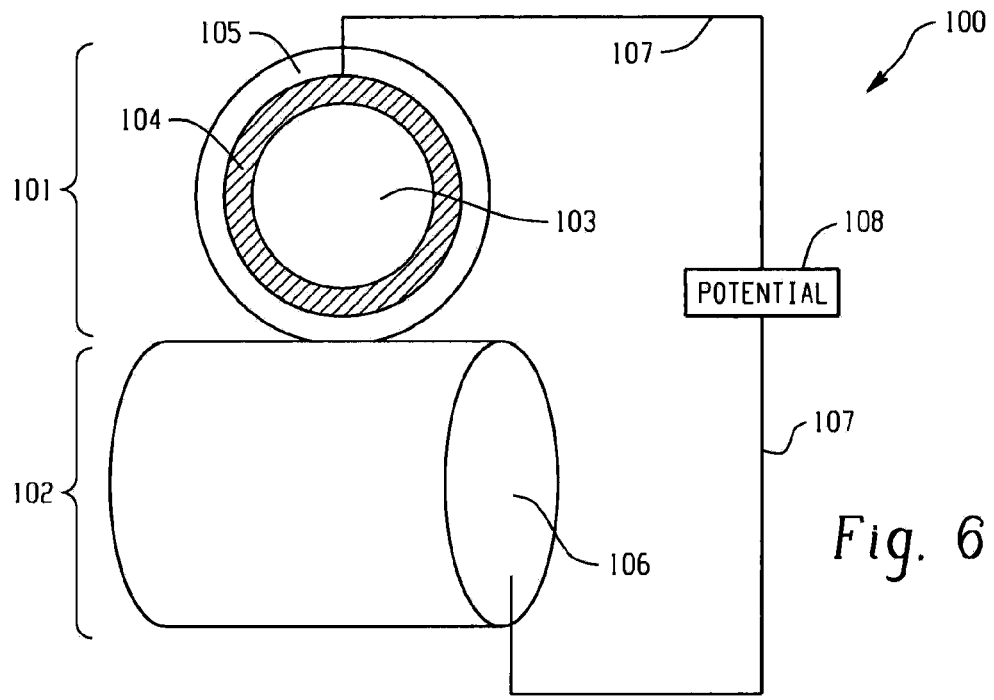
FIG. 6 is a magnified, schematic cross-sectional view of another exemplary electrochromic device comprising the electrochromic fabric of FIG. 4.

In an alternative embodiment to the electrochromic device 70 of FIG. 5, FIG. 6 is a magnified schematic cross-sectional view of an electrochromic device 100 comprising a first electrochromic fiber electrode 101 and a second fiber electrode 102, which is an electrically conductive, non-electrochromic electrode. Unlike the second fiber electrode 74 of FIG. 5, the second fiber electrode 102 does not comprise an electrochromic layer or a gel electrolyte layer disposed on the electrically conductive fiber. The electrochromic device 100 comprises the first electrochromic fiber electrode 101 woven in a first direction, the first fiber electrode comprising a first electrically conductive fiber 103, a first electrochromic layer 104 comprising a first electrochromic polymer disposed on electrically conductive fiber 103, and a first gel electrolyte layer 105 comprising a first gel electrolyte disposed on the first electrochromic layer 104. The second fiber electrode 102 is woven in another direction (i.e., perpendicular as shown in FIG. 4). Second fiber electrode 102 comprises second electrically conductive fiber 106. The electrically conductive fiber 106 can be any of the electrically conductive materials described above, such as an electrically conductive metal (e.g., stainless steel), an electrically conductive organic material, a non-conductive fiber rendered electrically conductive (e.g., nylon or spandex fiber coated with PEDOT-PSS), and the like. Again, while a woven fabric having the fibers in perpendicular relationship is shown, the fibers can be oriented in any direction relative to each other.

Conductive circuit 107 connects first electrochromic fiber electrode 101 and second fiber electrode 102 to electrical potential generator 108. Rather than requiring a joint as shown in FIG. 5, a conductive interface between first and second fiber electrodes 101 and 102 can be formed by simple pressure contact between the electrically conductive fiber 106 and the first gel electrolyte layer 105. Contact at the intersection point of the first electrochromic fiber electrode 101 and the second fiber electrode 102 forms a continuous conductive path from one fiber electrode to the other.

A method of forming an electrode as shown in FIG. 4 comprises weaving a first thread electrode and a second thread electrode; wherein the first thread electrode and the second thread electrode are independently electronically addressable, and wherein the first thread electrode and/or the second thread electrode comprises an electrochromic material. In one embodiment, the electrode has the form of a woven sheet. In another embodiment, the electrode comprises a woven pattern of two or more thread electrodes, wherein the two or more thread electrodes display a multi-colored visual image in response to an applied electrical potential.

Flexible electrochromic devices can be constructed using the individual fiber electrodes of FIG. 3 or the fabrics exemplified by FIG. 4. The electrochromic devices are capable of displaying a still or animated color image composed of a combination of red, green, and blue visible light. Displaying occurs typically by reflection or transmission of visible light rather than by emission when the electrochromic material is subjected to an electrical potential. The individual fiber electrodes and/or the fabrics comprising the fiber electrodes can be used to form a flexible garment. Although the entire garment can be electrochromic, the devices formed from fiber electrodes can be incorporated into other, existing fiber systems; for example by weaving an electrochromic patch or swatch into a portion of another piece of clothing.

In still another embodiment, a plurality of the electrochromic fibers can be used to manufacture a woven or nonwoven fabric wherein the individual electrochromic fibers are not independently addressed. In this embodiment, the fabric as a whole acts as a single addressable electrode. While these fabrics are generally in the form of a 2-dimensional woven or nonwoven planar sheet, their enhanced flexibility permits them to be shaped into 3-dimensional conformations such as a rolled sheet, a folded sheet, a twisted sheet, a coiled sheet, or other configuration.

Figure 7:
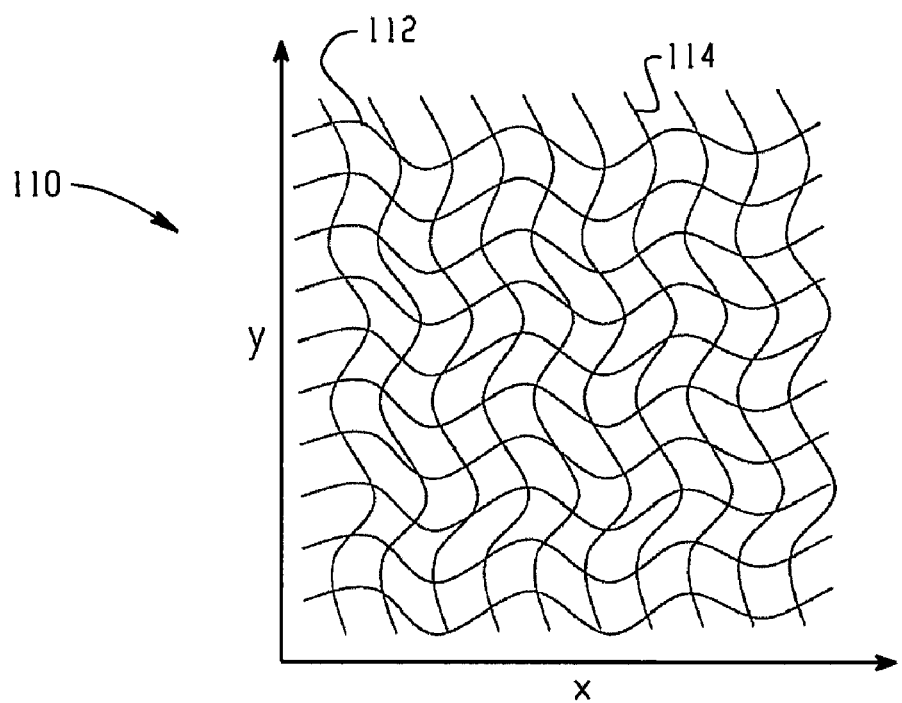
FIG. 7 is a schematic perspective view of an exemplary electrochromic fabric electrode.

FIG. 7 is a perspective view of an exemplary woven conductive flexible fabric 110 showing electrochromic fibers 112 and 114 woven in different directions. The electrochromic fibers used to form the fabric can be individually coated with an electrolyte, as in FIG. 3, or the fabric can be coated with an electrolyte after assembly with the electrochromic fibers. Non-conductive fibers can be present, as well as conductive, non-electrochromic fibers. The electrochromic fibers can also be used to form nonwoven fabrics. Again, the electrochromic fibers used to form the fabric can be individually coated with an electrolyte, as in FIG. 3, or the nonwoven fabric can be coated with an electrolyte after entanglement of the electrochromic fibers. Non-conductive fibers can be present, as well as conductive, non-electrochromic fibers. In any of these embodiments, the fabric can be used as an electrode in an electrochromic device. In one embodiment, the first and/or second electrochromic fiber electrodes 112, 114 can be a flexible, elastic material, such as spandex or nylon, coated with an electrically conductive material, such as PEDOT-PSS, and further coated with an electrochromic material.

The inventors hereof have further found that flexible, electrochromic fabrics can be produced by other methods, using either electrically conductive or nonconductive fabrics.

One type of flexible, electrically conductive fabric contains conductive fibers as described above, and is formed from the conductive fibers prior to application of an electrochromic material or gel electrolyte. Conductive fabrics include fabrics woven from conductive fibers or yarns, including those exemplified above, such as stainless steel fibers (e.g. Inox), copper fibers, and the like. Conductive fabrics can also be woven, specifically knitted, from a combination of nonconductive and conductive fibers (e.g., polyester and iron fibers as described in U.S. Pat. No. 6,153,124). Conductive fabrics can further comprise nonconductive fibers wherein each fiber has been treated to render the fibers conductive, prior to forming the fabric.

Electrically conductive fabrics can also be obtained from nonconductive fabrics that are subsequently treated to provide conductivity. Such nonconductive fabrics can comprise fibers or yarns of any of the exemplary synthetic and natural nonconductive materials described above. A specific exemplary flexible and elastic nonconductive woven cloth base is spandex, sold under the trade name LYCRA® by Dupont De Nemours. Spandex is a polyurethane containing segments of polyester or polyether polyols that allow the fiber to stretch up to 600% and then recover to its original shape. The fabric can be selected to be flexible, or both flexible and elastic. For example a flexible, elastic conductive fabric can be obtained by weaving or warp knitting the fabric from nylon and/or spandex fibers or yarns, and then plating the fabric with silver by known chemical deposition processes. Alternatively, a nylon fabric can be immersed in 100% aniline or an aqueous hydrochloride solution of aniline followed by initiating successive polymerization in a separate bath or mixed bath of oxidant and dopant solution with aniline to provide a poly (aniline) coating on the fabric. The resulting fabrics can be both flexible and elastic. The fabrics are not only more flexible than fabrics formed from metal fibers, but also tend to be lighter and more resistant to oxidation. Because the fibers or yarns can be knit tightly, the electrical conductivity of the fabric can be maintained despite a partial loss of the conductive coating on particular threads, whereas in metal fiber conductive fabrics, the fabric may lose operability after a break in one of the fibers, particularly if the fibers are spaced far apart. Stretch fabrics based on metallized nylons are commercially available from Shieldex Trading, USA.

Flexible, electrically conductive woven and nonwoven fabrics can further be produced by impregnating nonconductive woven or nonwoven fabrics with electrically conductive particulate fillers. The electrically conductive particles can comprise any of the electrically conductive metals, e.g., powdered stainless steel or organic polymers as described above, or other conductive particles such as ITO, carbon nanotubes, carbon black, graphene, and the like. The size, shape, and concentration of these particles can be varied to vary the conductivity of the fabric. In a specific embodiment, a nonconductive woven or nonwoven fabric is treated with a bonding agent (e.g., an organic polymer precursor or organic polymer, such a poly(acrylate)) containing the electrically conductive particles. Nonwoven polyester stretch fabrics of this type are commercially available from Krempel Group.

Figure 8:
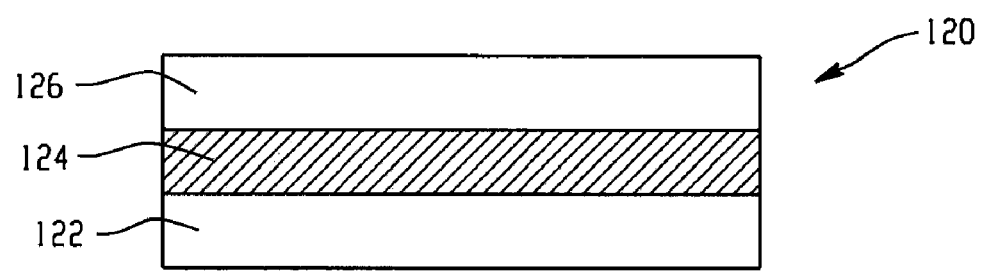
FIG. 8 is a schematic cross-sectional view of an electrochromic fabric electrode.

The conductive fabric (or nonconductive fabric that has been rendered conductive) can be coated with an electrochromic material (described in further detail below) to produce an electrochromic fabric electrode for an electrochromic device. The electrochromic fabric electrode also comprises a layer of gel electrolyte. This is exemplified in the schematic cross-sectional view of electrochromic fabric electrode 120 is shown in FIG. 8 (individual fibers are not shown). The electrochromic fabric electrode 120 comprises a conductive fabric 122, which can be any of the exemplary conductive fabrics described above. An electrochromic layer 124 is disposed on one face the conductive fabric. Alternatively, the conductive fabric can be embedded in a layer of an electrochromic material (not shown). A second layer 126 comprises a gel electrolyte disposed on electrochromic layer 124. Alternatively, electrochromic layer 124 and conductive fabric 122 can be embedded in gel electrolyte (not shown).

Figure 9:
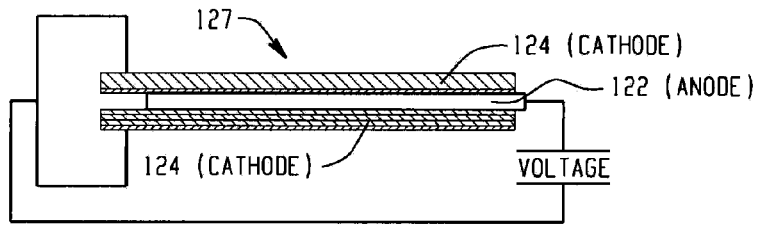
FIG. 9 is a schematic cross-sectional view of an electrochromic fabric electrode containing an electrochromic materials disposed on both faces of a conductive fabric, and the effects of switching polarity on the color of the electrochromic material.
Figure 9:
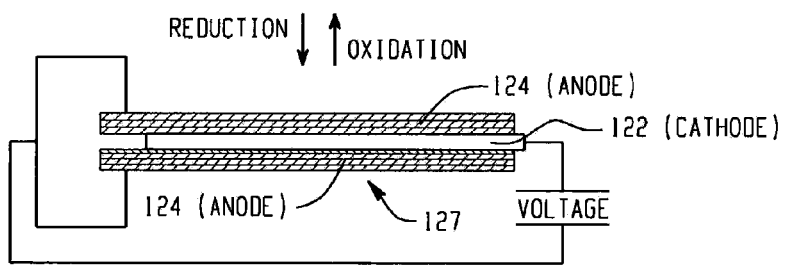

In a variation on electrode 120, the conductive fabric can be treated on both faces with an electroconductive and electrochromic material, as shown schematically in the layer diagram of FIG. 9. Electrochromic fabric electrode 127 contains electrochromic layer 124 disposed on each face of conductive fabric layer 122. Each electrochromic layer 124 is electronically addressable. FIG. 9 also illustrates the effect of changing polarity on the color response of the electrochromic layers 124. When conductive fabric layer 122 acts as the cathode and the electrochromic layers 124 act as the anode (lower diagram), the electrochromic material in layer 124 undergoes reduction to display the same color on each face of the cathode, as represented by the first cross hatching. Alternatively, when conductive fabric layer 122 acts as the anode and the electrochromic layers 124 each act as a cathode, the electrochromic material in layers 124 undergoes oxidation, resulting in a second color different from the first color, as represented by the directionally different cross hatching (upper diagram).

In one embodiment, a single electrochromic material is used to form the electrochromic fabric electrode. In another embodiment, two or more electrochromic materials are deposited on the conductive fabric imagewise to form an electrochromic fabric electrode that displays a colored image when subjected to an electrical potential. The colored image can comprise one or more visible colors.

The thickness of the electrically conductive and electrochromic layer will depend on factors such as the type of fabric, the type of electrolyte, the type of electrically conductive and electrochromic material, the device configuration, performance requirements, and like considerations, and can be readily determined by one of ordinary skill in the art without undue experimentation using the guidance herein. In one embodiment, the electrically conductive and electrochromic layer has a thickness of 0.1 to 10 micrometers, more specifically 0.1 to 6 micrometers, and even more specifically 3 to 6 micrometers.

Figure 10:
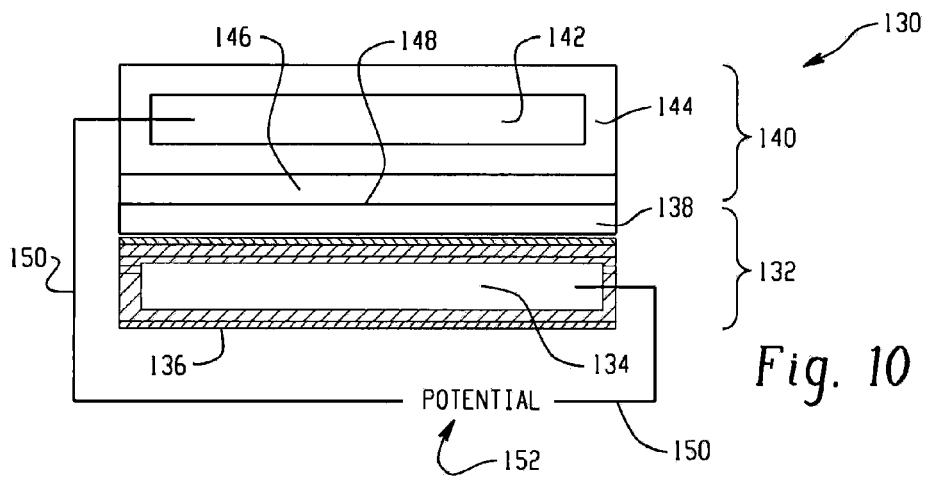
FIG. 10 is a schematic cross-sectional view illustrating an exemplary electrochromic device comprising one electrochromic fabric electrode.
Figure 11:
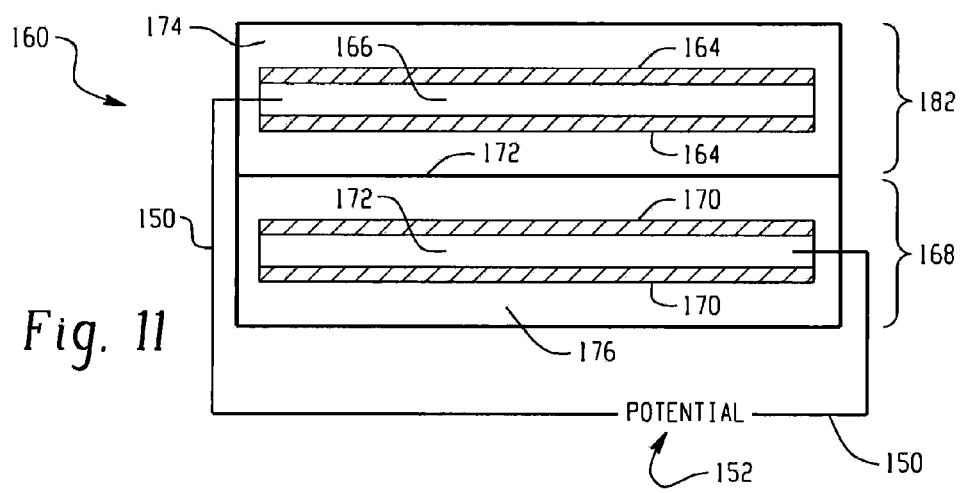
FIG. 11 is a schematic cross-sectional view illustrating an exemplary electrochromic device comprising two electrochromic fabric electrodes.
Figure 12:
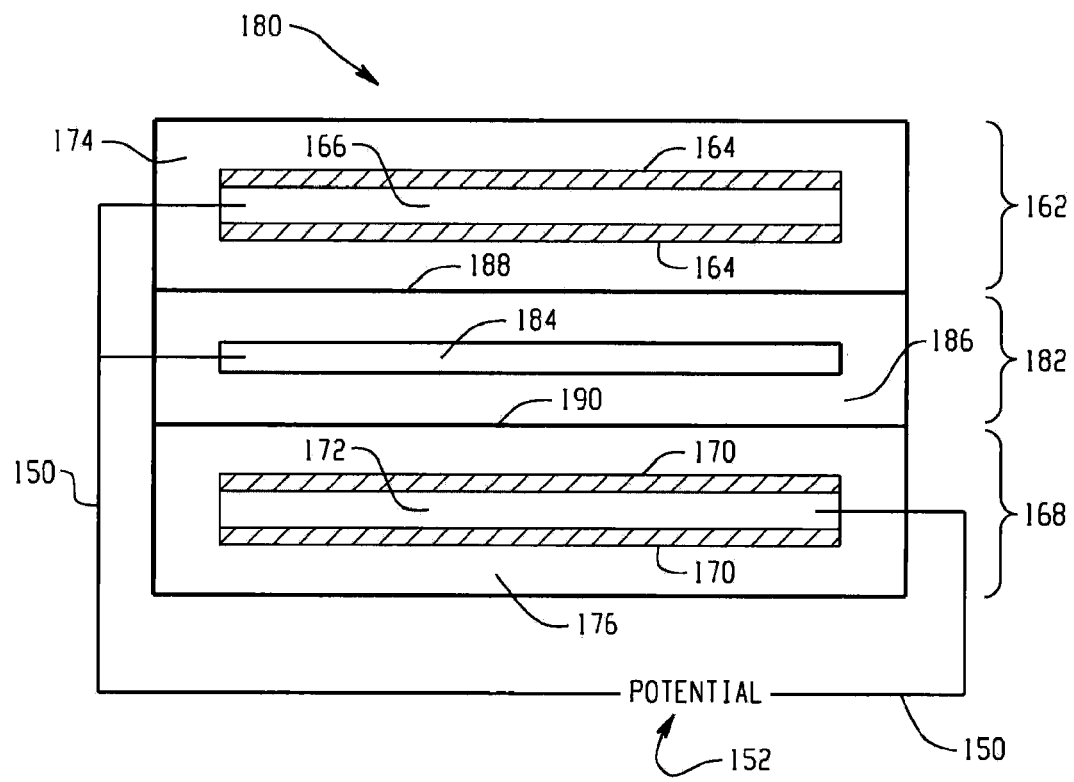
FIG. 12 is a schematic cross-sectional view an exemplary electrochromic device comprising two electrochromic fabric electrodes and one non-electrochromic fabric electrode.

The above-described electrochromic fabric electrodes can be used in a wide variety of different electrochromic device configurations, as exemplified in FIGS. 10-12. The devices can further comprise a non-electrochromic electrode, in particular a non-electrochromic fabric electrode.

FIG. 10 is a schematic cross-sectional view of an electrochromic device 130 comprising a first electrochromic fabric electrode 132 comprising a first conductive fabric 134 embedded in a first electrochromic layer 136. First electrolyte layer 138 comprising, e.g., a gel electrolyte, is disposed on a face of the first electrochromic layer 136. A second electrode, in particular non-electrochromic fabric electrode 140, which as shown in this embodiment comprises a nonconductive fabric 142 coated with an organic conductive material 144 and a second electrolyte 146, e.g., a gel electrolyte. Alternatively, in one embodiment, the first and/or second electrochromic fabric electrodes 132, 140 can be a flexible, elastic material, such as spandex or nylon, coated with an electrically conductive material, such as PEDOT-PSS, and further coated with an electrochromic material.

Boundary 148 represents the contact region of first electrochromic fabric electrode 132 with second non-electrochromic fabric electrode 140. The combined thickness of the electrolyte layers 138 and 146 will depend on manufacturing and use considerations and can be, for example, 50 to 200 micrometers, and even more specifically 75 micrometer to 150 micrometers.

First electrochromic fabric electrode 132 and second non-electrochromic fabric electrode 142 are connected by a conductive circuit 150 (e.g. copper, aluminum, or steel wire) to electrical potential generator 152. Either electrode 132 or 142 can be the anode or the cathode.

FIG. 11 is a schematic cross-section illustrating an electrochromic device 160 comprising a first electrochromic fabric electrode 162 comprising a first electrochromic material 164 disposed on or surrounding first conductive fabric 166, and a second electrochromic fabric electrode 168 comprising a second electrochromic material 170 disposed on or surrounding second conductive fabric 172. First electrochromic fabric electrode 162 further comprises an electrolyte layer 174 comprising, e.g., a gel electrolyte, and second electrochromic fabric electrode 168 further comprises an electrolyte layer 176 comprising, e.g., a gel electrolyte. Either electrode 162 or 168 can serve as the anode or cathode. Each electrode 162 and 168 can reversibly change color in response to an applied electrical potential. Further, electrodes 162 and 168 can display the same color or different colors simultaneously. Typically, when each electrode comprises the same electrochromic material, the electrodes display different colors simultaneously, due to the electrochromic material undergoing oxidation at the cathode and reduction at the anode, a so-called "dual electrochromic" design. In one embodiment, the first and/or second electrochromic fiber electrodes 162, 168 can be a flexible, elastic material, such as spandex or nylon, coated with an electrically conductive material, such as PEDOT-PSS, and further coated with an electrochromic material.

FIG. 12 illustrates a schematic cross-sectional view of an exemplary electrochromic device 180 comprising a first electrochromic fabric electrode 162, a second electrochromic fabric electrode 168, each as described in FIG. 11, and a third non-electrochromic fabric electrode 182 disposed between first and second electrochromic fabric electrodes 162 and 168. Third non-electrochromic fabric electrode 182 comprises a third conductive fabric 184 and a third electrolyte layer 186 comprising, e.g., a gel electrolyte surroundingly disposed on third conductive fabric 184. As before, each electrode 162, 168, and 182 can serve as an anode or cathode in the electrochromic device. In this case, electrode 162 and 168 will coexist as an anode or a cathode and electrode 182 will be its complement. Boundary 188 indicates a first conductive interface between fabric electrodes 162 and 182. Boundary 190 indicates a second conductive interface between fabric electrodes 182 and 168. Third non-electrochromic fabric electrode 182 allows the same electrical potential and polarity to be applied simultaneously or alternately to the first and the second electrochromic fabric electrodes 162 and 168. Thus, when first and second electrochromic fabric electrodes 162 and 168 comprise the same electrochromic material, the same color change can be effected from each electrode. Alternatively, first and second electrochromic fabric electrodes 162 and 168 can have different electrochromic materials, or receive different polarities simultaneously, to form different colors simultaneously, or simultaneously switch multiple colors. In one embodiment, the first and/or second electrochromic fiber electrodes 162, 168 can be a flexible, elastic material, such as spandex or nylon, coated with an electrically conductive material, such as PEDOT-PSS, and further coated with an electrochromic material.

Any of the above-described electrochromic devices comprising the fiber electrodes or the fabric electrodes can further comprise an optional protective layer disposed on one or more exposed faces of the electrodes. The properties of the optional protective layers can vary depending on the intended use. Desirable properties include transparency and/or surface texture that imparts the feel of traditional fabric. Non-limiting examples of materials for such purposes include polyamides, polyesters, polypropylene, polyethylene, polyethylene terephthalate, block co-polymers (examples polyurethane and polyamide), and polybutylene terephthalate.

Turning now to the electrochromic materials, a wide variety of electrochromic materials are known and can be used, including inorganic materials such as transition metal oxides (e.g., vanadium, nickel, iridium, and tungsten oxide), fullerenes, Prussian blue (ferric ferricyanide); organometallic materials such as ferrocenes and ferrocenyl salts; and organic materials such as phthalocyanines, viologens, certain dyes, and conjugated polymers such as iodine-doped poly(acetylene), poly(thiophene), poly(phenylene), poly(phenylene sulfide), poly(pyrrole), and poly(aniline). Still other electrochromic materials are derived from silane precursors, norbornene precursors, and soluble conducting polymers. Reviews on the various categories of electrochromic polymers have been published. (See for example, N. Rowley and R. Mortimer, "New Electrochromic Materials", Science Progress (2002), 85 (3), 243-262 and "Electrochromic Materials", in Proceedings of the Electrochemical Society, K. Ho, C. Greenberg, D. MacArthur, eds., Volume 96-23, 1997 among others). Electrochromic organic polymers are particularly useful, and $3^{rd}$ have been described, for example, in the "Handbook of Conducting Polymers," Ed. By Skotheim and Reynolds, Chs. 1-5, 9, 10, 11, 20. Desirable properties for the electrochromic polymer include a high degree of transparency in the visible color region in the "off" state (non-reduced or non-oxidized states, high absorption in visible spectral region upon electroreduction or electrooxidation ("on" state) (or in the case of multi-colored polymers, a high contrast between colored states), low electrochemical potential for reduction/oxidation, high stability in the "on" or "off" state (bi-stable), strong adsorption to the conductive fiber, color tunability by synthetic variation of the electrochromic precursor, low solubility of the electrochromic materials in common solvents, and low toxicity. Desirable electrochromic materials are those that undergo the highest contrast change upon oxidation or reduction, that is, from a colorless to a highly colored state, from a colored state to a colorless one, or from one colored state to another colored state upon oxidation and reduction.

The electrochromic layer can be formed by direct coating of the electrochromic material, or by methods such as electrochemical deposition or in situ polymerization. In one embodiment the electrochromic material is a polymer formed by chemical or electrochemical oxidative polymerization of an electrochromic polymer precursor comprising a functional group selected from pyrolle (1-aza-2,4-cyclopentadiene), thiophene, aniline, furan, carbazole, azulene, indole, bipyridine, diazapyrene, perylene, naphthalene, phenothiazine, triarylamine, substituted phenylendiamine, benzothiadiazole, ferrocene, and the derivatives of the foregoing compounds. The chemical or electrochemical polymerization of precursors can be performed after disposing the electrochromic precursor onto the conductive fiber or the conductive fabric. Alternatively, the electrochromic material can be formed by solution electrochemical polymerization of a dissolved electrochromic precursor, resulting in deposition of insoluble electrochromic material on a surface of the substrate.

The electrochromic precursor can be monomeric (in the case of electrodeposition) or polymeric, and can be selected from cathodically coloring materials, anodically coloring materials, or a combination thereof. In particular, the electrochromic precursor is a polymer or oligomer that can undergo further chain growth and/or crosslinking to produce the electrochromic material adheringly disposed on a substrate. "Polymerizing" includes chain growth reactions and/or crosslinking reactions to form the electrochromic material from an electrochromic precursor.

Cathodically coloring materials have a band gap ($E_g$) less than or equal to 2.0 eV in the neutral state. A cathodically coloring material changes color when oxidized (p-doped). The change in visible color can be from colored in the neutral state to colorless in the oxidized state, or from one color in the neutral state to a different color in the oxidized state. Cathodically coloring materials include, but are not limited to, polymers derived from a 3,4-alkylenedioxyheterocycle such as an alkylenedioxypyrrole, alkylenedioxythiophene or alkylenedioxyfuran. These further include poly(3,4-alkylenedioxyheterocycle)s comprising a bridge-alkyl substituted poly(3,4-alkylenedioxythiophene), such as poly(3,4-(2,2-dimethylpropylene)dioxythiophene) (PProDOT-(Me)$_2$, poly(3,4-(2,2-dihexylpropylene)dioxythiophene) PProDOT-(hexyl)$_2$, or poly(3,4-(2,2-bis(2-ethylhexyl)propylene)dioxythiophene) PProDOT-(ethylhexyl)$_2$. Herein, "colored" means the material absorbs one or more radiation wavelengths in the visible region (400 nm to 700 nm) in sufficient quantity that the reflected or transmitted visible light by the material is visually detectable to the human eye as a color (red, green, blue or a combination thereof).

An anodically coloring material has a band gap $E_g$ greater than 3.0 eV in its neutral state. An anodically coloring material changes color when reduced (n-doped). The material can be colored in the neutral state and colorless in reduced state, or have one color in the neutral state and a different color in the reduced state. An anodically coloring material can also comprise a poly(3,4-alkylenedioxyheterocycle) derived from an alkylenedioxyheterocycle such as alkylenedioxypyrrole, alkylenedioxythiophene or alkylenedioxyfuran. Exemplary anodically coloring poly(3,4-alkylenedioxyheterocycle)s comprise an N-alkyl substituted poly(3,4-alkylenedioxypyrrole), such as poly(N-propyl-3,4-propylenedioxypyrolle) N-Pr PProDOP, poly(N-Gly-3,4-propylenedioxypyrolle) N-Gly PProDOP, where N-Gly designates a glycinamide adduct of pyrolle group, or N-propane sulfonated PProDOP (PProDOP-NPrS).

Electrochromic polymers also include, for example, poly(3,4-ethylenedioxythiophene) (PEDOT), poly(3,4-propylenedioxythiophene) (PProDOT), and poly(1,4-bis[(3,4-ethylenedioxy)thien-2-yl)]-2,5-didodecyloxybenzene) P(BEDOT-B).

Specific electrochromic precursors include those of formula (1):

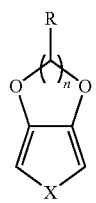

(1)

wherein X is NH, S, O, or N-G wherein G is a straight, branched chain, or cyclic, saturated, unsaturated, or aromatic group having from 1 to 20 carbon atoms and optionally 1 to 3 heteroatoms selected from S, O, Si, and N, and optionally substituted with carboxyl, amino, phosphoryl, sulfonate, halogen, or straight, branched chain, or cyclic, saturated, unsaturated, or aromatic group having from 1 to 6 carbon atoms and optionally 1 to 3 heteroatoms selected from S, O, Si, and N (for example phenyl, substituted phenyl, or propyl sulfonate); R is H, an O-alkyl group comprising 1 to 20 carbons, or an alkyl group comprising 1 to 20 carbons; those of formula (2):

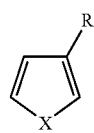

(2)

wherein X is NH, S, O, or N-G wherein G is a straight, branched chain, or cyclic, saturated, unsaturated, or aromatic group having from 1 to 20 carbon atoms and optionally 1 to 3 heteroatoms selected from S, O, Si, and N, and optionally substituted with carboxyl, amino, phosphoryl, sulfonate, halogen, or straight, branched chain, or cyclic, saturated, unsaturated, or aromatic group having from 1 to 6 carbon atoms and optionally 1 to 3 heteroatoms selected from S, O, Si, and N (for example phenyl, substituted phenyl, or propyl sulfonate), and R is independently H, O-alkyl comprising 1 to 20 carbons, or an alkyl group comprising 1 to 20 carbons; those of formula (3):

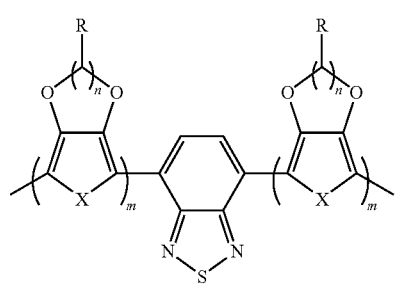

(3)

wherein X is NH, S, O, or N-substituted, R is H, an O-alkyl group comprising from 1 to 20 carbons, or an alkyl group comprising from 1 to 20 carbons, n is an integer from 1 to 20, and m is an integer from 1 to 100; those of formula (4):

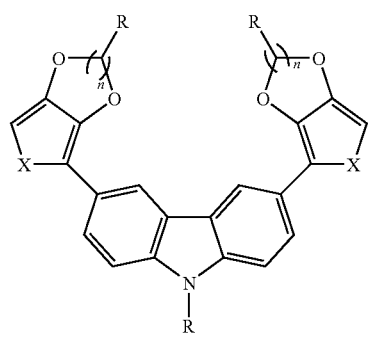

(4)

wherein X is NH, S, O, or N N-G wherein G is a straight, branched chain, or cyclic, saturated, unsaturated, or aromatic group having from 1 to 20 carbon atoms and optionally 1 to 3 heteroatoms selected from S, O, Si, and N, and optionally substituted with carboxyl, amino, phosphoryl, sulfonate, halogen, or straight, branched chain, or cyclic, saturated, unsaturated, or aromatic group having from 1 to 6 carbon atoms and optionally 1 to 3 heteroatoms selected from S, O, Si, and N (for example phenyl, substituted phenyl, or propyl sulfonate), R is H, an O-alkyl group comprising from 1 to 20 carbons, or an alkyl group comprising 1 to 20 carbons, and n is an integer from 1 to 20; those of formula (5):

(5)

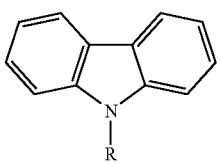

R is H, an O-alkyl group comprising 1 to 20 carbons, or an alkyl group comprising 1 to 20 carbons; or those of formula (6):

(6)

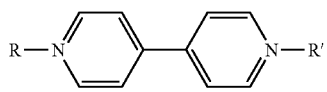

wherein R and R' is each independently an O-alkyl group comprising 1 to 20 carbons, or an alkyl group comprising 1 to 20 carbons.

Another electrochromic polymer precursors have the general formulas (7a) and 7(b):

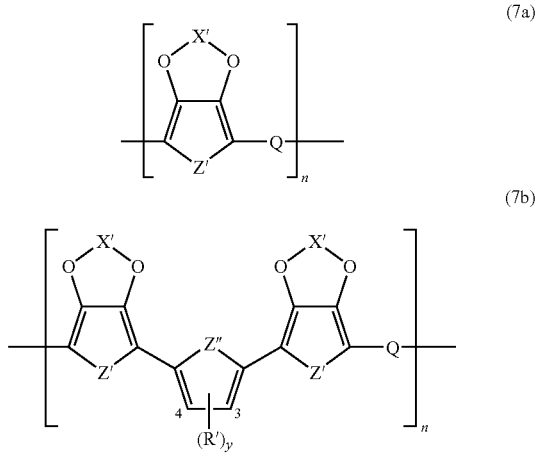

wherein n is an integer greater than 0; y is an integer from 0 to 2; Z' and Z" are independently —O—, —NH—, or —S—; X' is an alkylene group comprising 1 to 20 carbons; Q is a silylene group, for example —Si(R)$_2$— or —Si(R)$_2$—O—Si(R)$_2$—, wherein R is an alkyl group comprising 1 to 20 carbons, for example methyl, ethyl, propyl, isopropyl, n-butyl, n-pentyl, n-hexyl, n-heptyl, or n-octyl; and R' is an alkyl or aryl group comprising 1 to 20 carbons attached at the 3 and/or 4 position (shown) of the five-membered ring containing Z". Exemplary R' include methyl, ethyl, propyl, isopropyl, n-butyl, n-pentyl, n-hexyl, n-heptyl, n-octyl, phenyl, n-butylthio, n-octylthio, phenylthio, and methoxyphenyl.

In one embodiment, n is an integer from 1 to 1000, y is 0, X' is ethylene (—CH$_2$CH$_2$—), Z' and Z" are both sulfur, Q is —Si(R)$_2$—, and R is n-octyl. This 2,5-bis[(3,4-ethylenedioxy)thien-2-yl]-thiophene (BEDOT-T) silylene precursor polymer can be formed by the nickel-catalyzed coupling of 3,4-ethylenedioxythiophene with dibromothiophene, to form BEDOT-T, followed by deprotonation of BEDOT-T using n-BuLi to form a dianion of BEDOT-T, and reacting the dianion with dichlorodioctylsilane to form the BEDOT-T silylene precursor polymer. The weight average molecular weight of the BEDOT-T silylene precursor polymer can be 1000 to 100,000 g/mole, more specifically 1,000 to 10,000 g/mole.

In another specific embodiment, n is an integer from 1 to 1000, y is 0, and R' is n-octyl, X' is 2,2-dimethylpropylene (—CH$_2$C(CH$_3$)$_2$CH$_2$—), Z' and Z" are both sulfur, Q is —Si(R)$_2$—O—Si(R)$_2$—, and R is methyl. This ProDOT-Me$_2$ silylene precursor polymer can be prepared by transesterification of 3,4-dimethoxythiophene with 2,2-dimethyl-1,3-propanediol using para-toluene sulfonic acid (PTSA) or dodecylbenzene sulfonic acid (DBSA) as catalysts in anhydrous toluene to form ProDOT-Me$_2$, deprotonating the ProDOT-Me$_2$ using 2 equivalents of n-BuLi to form the dilithium dianion, and reacting the dilithium dianion with dichlorotetramethylsiloxane to form the ProDOT-Me$_2$ silylene precursor polymer. The weight average molecular weight of the ProDOT-Me$_2$ silylene precursor polymer can be 1000 to 100,000 g/mole, more specifically 1,000 to 5000 g/mole.

In addition to the heterocyclic ring systems shown in the precursors of formulas (7a) and 7b), other aromatic heterocycle groups, e.g., those of formulas (2)-(6), can also be synthesized with silylene of formula Q. Additional electrochromic precursors are described, for example, in U.S. Pat. No. 7,321,012, U.S. Publ. No. 2007/0089845, WO2007/008978, and WO2007/008977.

A variety of electrolyte compositions are known for use in electrochromic devices. In one embodiment the electrolyte is a gel electrolyte. The gel electrolyte layer can be formed by coating a gel electrolyte precursor mixture comprising a gel electrolyte precursor. The gel electrolyte precursor can be monomeric or polymeric. In particular, the gel precursor is a crosslinkable polymer. The crosslinkable polymer can comprise polymerizable end groups, polymerizable side-chain groups, or a combination thereof attached to a polymer backbone. Exemplary polymer backbones include polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof. More specifically, the gel precursor is a cross-linkable polyether. Exemplary polyethers include poly(alkylene ethers) and poly(alkylene glycol)s comprising ethyleneoxy, propyleneoxy, and butyleneoxy repeating units. Hydroxyl end groups of poly(alkylene glycols) can be capped with polymerizable vinyl groups including (meth)acrylate and styryl vinyl groups to form a crosslinkable polyether. In particular, the crosslinkable polymer is selected from the group consisting of poly(ethylene glycol) diacrylate (PEG-DA), poly(propylene glycol) diacrylate (PPG-DA), poly(butylene glycol) diacrylate (PBG-DA), poly(ethylene oxide) (PEO), poly(propylene oxide) (PPO), poly(butylene oxide) (PBO), and combinations thereof. The crosslinkable polymer can also be a copolymer or a block copolymer comprising ethyleneoxy, propylenoxy, or butyleneoxy repeating units. In one embodiment, the gel precursor is PEO and is crosslinked thermally. In a specific embodiment, the gel precursor is crosslinkable polymer comprising a mixture of PEG-DA and PEO, wherein the PEO:PEG-DA weight ratio is from 95:5 to 5:95, more particularly 90:10 to 10:90, and even more particularly 60:40 to 40:60 or 50:50.

A gel electrolyte precursor mixture also comprises an electrolyte. The electrolyte comprises an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}$ $SO_3$ ($2 \leq n \leq 3$), $MN(RfOSO_2)_2$ (wherein Rf is a fluoroalkyl group), MOH, or combinations of the foregoing electrolytes. In particular, the electrolyte comprises a lithium salt. More particularly, the lithium salt is lithium triflate.

The gel electrolyte precursor mixture can also comprise a solvent or plasticizer to enhance the ionic conductivity of the electrolyte. In particular the solvent can be a carbonate, for example dimethyl carbonate, ethylmethyl carbonate, methylpropyl carbonate, methylbutyl carbonate, methylpentyl carbonate, diethyl carbonate, ethylpropyl carbonate, ethylbutyl carbonate, dipropyl carbonate, propylene carbonate, ethylene carbonate and combinations thereof.

The gel electrolyte precursor mixture comprises the electrolyte and the gel precursor in a weight ratio of 1 to 10, with a 0.002 to 1 to 10 ratio of initiator to electrolyte to gel precursor, by weight.

The gel precursor mixture can further comprise other additives such as photochemical sensitizers, free radical initiators, and diluent polymers, providing the desired properties of the electrochromic device are not significantly adversely affected; for example, the ionic conductivity of the gel electrolyte, the switching speed of the electrochromic response, color contrast of the electrochromic response, adhesion of the gel electrolyte to the substrate, and flexibility of the electrodes.

A variety of different techniques can be used to apply electrochromic materials, electrochromic polymer precursor mixture, or gel electrolyte precursor mixture to the conductive fibers or to the conductive fabrics, for example spray coating, ink jet coating, dip coating, electrostatic spinning, gravure coating methods, and extrusion coating. Ink-jet coating, stamping, screen printing, rotary press, and similar printing techniques can also be used to apply the electrochromic polymer precursor or gel electrolyte precursor mixtures to the conductive fabric.

These coating techniques generally comprise forming a mixture of the material to be coated with a solvent, applying the mixture to a surface of a substrate, (i.e., the conductive fiber or the conductive fabric), and removing the solvent to form a thin film of the material adheringly disposed on the surface of the substrate. The solvent can be an organic solvent or combination of an organic solvent and water. Exemplary organic solvents include dichloromethane (DCM), toluene, N,N-dimethyl formamide (DMF), propylene glycol monomethyl ether acetate (PGMEA), propylene glycol monomethyl ether (PGME), acetone, methanol, and ethanol.

The mixture can contain the electrochromic polymer precursor at a concentration of 0.01 weight percent (wt. %) to 5 wt. %, based on the total weight of the mixture. More particularly, the mixture can contain the electrochromic polymer precursor at a concentration of from 0.01 wt. % to 1.5 wt. % in a solvent, for example dichloromethane. Specifically, for spray coating trials, a concentration of 2 mg/mL precursor polymer/solvent has been used (0.1 wt. %). In some instances, the material to be coated can be a liquid and can be coated neat. In other instances when a solvent is not used, evaporative coating or powder coating techniques can be employed for disposing a solid material to the surface of the substrate.

Alternatively, in some instances, the precursor to be coated is a liquid and can be coated neat. In other instances, when a solvent is not desirable, evaporative coating or powder coating techniques can be used to apply the solid material to the surface of a substrate.

Polymerizing the electrochromic polymer precursor can be accomplished electrochemically (in situ or ex situ), chemically, thermally, or by radiative crosslinking. In particular, the electrochromic precursor is polymerized electrochemically.

For example, the conductive fiber or fabric, once coated with the electrochromic polymer precursor, can be converted to an electrochromic electrode in situ (inside an assembled device type) by applying an oxidative potential across the device. The electrochromic polymer precursor irreversibly converts to the electrochromic polymer and can be switched as normal, with a moderate reduction in optical contrast. More commonly, the coated electrically conductive fiber or fabric is converted ex situ. The coated electrically conductive fiber or fabric is immersed in a 0.1 M electrolyte solution (typically lithium triflate in acetonitrile, though many other salts and solvents can be used) and the appropriate voltage is applied via a three-electrode cell (using a Pt counter electrode and a calibrated non-aqueous $Ag/Ag^+$ reference electrode) for a given period of time, depending on the desired thickness of the electrochromic precursor layer. In this manner, an insoluble electrochromic layer of material is disposed on the electrically conductive fiber or fabric, which is then ready to be coated with the next layer (the gel electrolyte) to form an electrochromic electrode.

The electrolyte gel precursor can be converted to a gel via radical crosslinking or thermal crosslinking methods, in particular by exposure to ultraviolet (UV) radiation. Crosslinking is generally carried out ex situ.

Thus, in one embodiment, a method of forming a flexible, electrochromic fiber or fabric, comprises disposing an electrochromic material on a surface of an electrically conductive fiber or fabric to form an electrochromic layer on the surface of the electrically conductive fiber or fabric. The method can further comprise disposing an electrolyte composition on the electrochromic layer to form the flexible, electrochromic fiber or fabric. In a specific embodiment, disposing the electrochromic material comprises disposing a monomeric electrochromic precursor, and polymerizing the electrochromic precursor to form a polymeric electrochromic layer on the surface of the electrically conductive fiber or fabric; and disposing the electrolyte comprises disposing a mixture comprising a gel precursor and an electrolyte on the polymeric electrochromic layer, and polymerizing the gel precursor to form the flexible, electrochromic fiber or fabric. A plurality of the flexible, electrochromic fibers can be used to form an electrochromic fabric by weaving or entangling the plurality of flexible, electrochromic fibers.

In another embodiment, a method of forming a flexible, electrochromic fiber or fabric comprises disposing an electrically conductive, electrochromic material onto a non-electrically conductive fiber or fabric to form an electrically conductive electrochromic fabric. The method can further comprise disposing an electrolyte composition on the electrically conductive, electrochromic layer to form the flexible, electrochromic fiber or fabric. The non-electrically conductive fiber or fabric comprises a natural or synthetic non-electrically conductive organic polymer, specifically an elastic material, for example spandex. A flexible, electrochromic fabric can be formed from a plurality of the flexible, electrochromic fibers by weaving or entangling the plurality of flexible, electrochromic fibers. Alternatively, the fabric is a spandex fabric.

Also disclosed are articles comprising the above-described electrochromic fibers, fabrics, and devices, such as garments. The electrochromic device can be the entire garment or a portion of the garment. The electrochromic device can further be an integral part of the garment or a detachable portion of the garment. The electrochromic device can be reversibly stretchable.

The invention is further illustrated by the following non-limiting Examples.

EXAMPLES

Example 1

This example demonstrates a two-layered electrochromic device comprising flexible electrochromic fabric electrodes.

A gel precursor mixture was prepared by combining polyethylene glycol diacrylate (PEG-DA), propylene carbonate (5 g each), 1 g lithium trifluoromethane sulfonate (LITRIF or lithium triflate), and 20 mg of 2,2-dimethoxy phenylacetophenone (DMPAP) as photoinitiator for the curing of the electrolyte into a gel.

Figure 13:
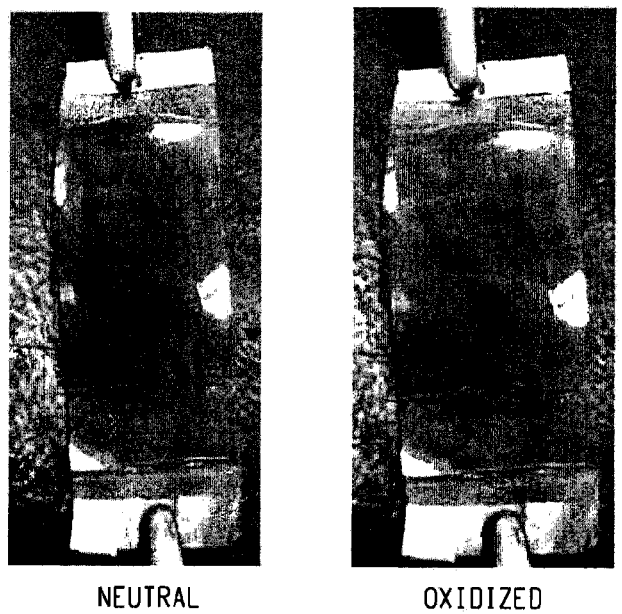
FIG. 13 is a pair of photographs showing the neutral and oxidized states of a two-layered electrochromic device.

Two pieces of wire mesh fabric, 1 cm by 2 cm in dimension (woven Inox fiber obtained from ITP) were separately spray-coated with BEDOT-T silylene precursor on both sides of the fabric from a 0.1 wt. % solution in dichloromethane, using an Iwata spray coating apparatus. The precursor was then converted to electrochromic polymer using electrochemical oxidation by dipping the fabric into electrolyte solution as described above and applying a potential sufficient enough to oxidize the BEDOT-T silylene precursor. Then, one piece of fabric was placed onto a glass slide and a solution of polyethylene glycol diacrylate (PEG-DA) containing lithium triflate was placed atop the fabric. The second piece of fabric was then placed on top of this solution and the PEG-DA was crosslinked by UV irradiation at 365 nm to encase each layer of fabric in gel electrolyte, forming a two-layered device. The encased fabric layers demonstrated the ability to switch between blue and red in less than half of a second (500 ms). When one side of the fabric was red, the other side of the fabric was blue. Upon reversal of the potential, the red side turned blue and the blue side turned red. FIG. 13 contains two photographs showing the neutral (red) and oxidized states (blue).

Replacement of this PEG-DA with a transparent PEO/LITRIF matrix allows for thermal curing. Other electrolyte combinations can be employed for optimization of the device function.

Example 2

This example describes a method for the preparation of conductive fabric using an aqueous PEDOT-PSS polymer dispersion (commercially available from Agfa under the trade name Orgacon™). In this example, a spandex fabric from Lubrizol was used, although other forms of spandex, cotton, and other fabric-like materials are amenable to the same procedure and may yield similar conductance.

The spandex fabric sample was immersed in an aqueous dispersion of PEDOT-PSS. Alternatively, the aqueous dispersion could be spray coated or drop cast onto the fabric. The coated spandex fabric was allowed to air dry. The originally white fabric was now a light blue and electrically conductive. The material was fully flexible, stretchable, and deformable and retains its conductivity after such deformation. The material does not appear white after stretching, indicating that the PEDOT-PSS conducting polymer has been incorporated into the strands of the fabric itself and is not merely coated on the surface (i.e., it has been absorbed into the fabric). Initial measurements determined the contact conductivity values of the coated fabric at 0.074 S/cm for these fabric samples. Conductivity is measured using the 4 line collinear array method in which current is supplied between the outer two metallic leads and a voltage difference is measured between the inner two metallic leads. Conductivity=l/twR, wherein l is the distance between metallic leads, t is the film thickness of the sample, w is the width of the sample and R is the resistance obtained from the voltage drop (V=IR).) Details of the conductivity measurements are described by R. K. Hiremath et al., "Review of Scientific Instruments, Vol. 77, 126106 (2006).

Studies will be undertaken to ascertain the effect of the following variables on the measured conductivity: (1) length of exposure of the fabric, (2) washability of the fabric (performance after exposure to water/soap, etc.), (3) length of deformation, (4) result of multiple deformations, (5) effect of second dopants, e.g. sorbitol, (6) resistive heating (i.e., how much current/voltage can be applied to the fabric samples and how much heat is thus generated), and (7) effect of heat treatments on the fabric after exposure to conducting polymer. Also, microscopy will be employed to investigate the nature of the interaction between fabric and conductor.

The singular forms "a," "an," and "the" include plural referents unless the context clearly dictates otherwise. The endpoints of all ranges directed to the same characteristic or component are independently combinable and inclusive of the recited endpoint.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. An electrochromic device, comprising:
   at least two electrodes;
   an electrolyte disposed between the electrodes; and
   a potential source in electrical connection with the at least two electrodes,
   wherein at least one of the electrodes comprises one or more of an electrochromic fiber or fabric, comprising:
   a flexible, electrically conductive fiber, and
   a layer comprising an electrochromic material disposed on and surrounding the flexible, electrically conductive fiber.

2. The electrochromic device of claim 1, wherein at least one of the electrodes comprises one or more flexible, electrically conductive, non-electrochromic fibers or fabric.

3. The electrochromic device of claim 2, wherein the electrochromic fabric comprises spandex or nylon, and the electrically conductive material comprises PEDOT-PSS, a poly(vinylpyridine), or a combination comprising at least one of the foregoing.

4. The electrochromic device of claim 1, wherein a first electrode comprises a first electrochromic fiber, and a second electrode comprises a second electrochromic fiber, wherein the first and second fibers are independently electronically addressed.

5. The electrochromic device of claim 1, wherein the device is elastic.

6. The electrochromic devices of claim 1, wherein the electrolyte is a gel electrolyte comprising an electrolyte salt.

7. An article comprising the electrochromic device of claim 1.

8. The article of claim 7, wherein the article is a garment, and the electrochromic devices form all or a portion of the garment.

9. A method of forming a flexible, electrochromic fiber or fabric, comprising:
- disposing an electrochromic material on a surface of an electrically conductive fiber or fabric to form an electrochromic layer on the surface of the electrically conductive fiber or fabric, wherein disposing the electrochromic material comprises disposing a monomeric electrochromic precursor, and polymerizing the electrochromic precursor to form a polymeric electrochromic layer on the surface of the electrically conductive fiber or fabric; and
- disposing the electrolyte comprises disposing a mixture comprising a gel precursor and an electrolyte on the polymeric electrochromic layer, and polymerizing the gel precursor to form the flexible, electrochromic fiber or fabric.

10. The method of claim 9, wherein the electrically conductive fiber or fabric comprises a conductive metal, a conductive polymer, or a combination comprising at least one of the foregoing.

11. The method of claim 9, wherein the electrically conductive fabric is a stainless steel mesh.

12. The method of claim 9, wherein the electrically conductive fiber or fabric comprises a natural or synthetic non-electrically conductive organic polymer fiber or fabric rendered electrically conductive by treatment with a conductive material.

13. The method of claim 12, wherein the non-electrically conductive fiber or fabric comprises spandex, nylon, or a combination comprising at least one of the foregoing.

14. The method of claim 12, wherein the non-electrically conductive fiber or fabric is elastic.

15. The method of claim 12, wherein the electrically conductive material is PEDOT-PSS, a poly(vinylpyridine), or a combination thereof.

16. The method of claim 12, wherein the electrically conductive fabric is a non-electrically conductive fabric rendered electrically conductive by impregnation with electrically conductive particles.

17. The method of claim 9, further comprising forming the flexible, electrochromic fabric from a plurality of the flexible, electrochromic fibers by weaving or entangling the plurality of flexible, electrochromic fibers.

* * * * *